UNITED STATES PATENT OFFICE.

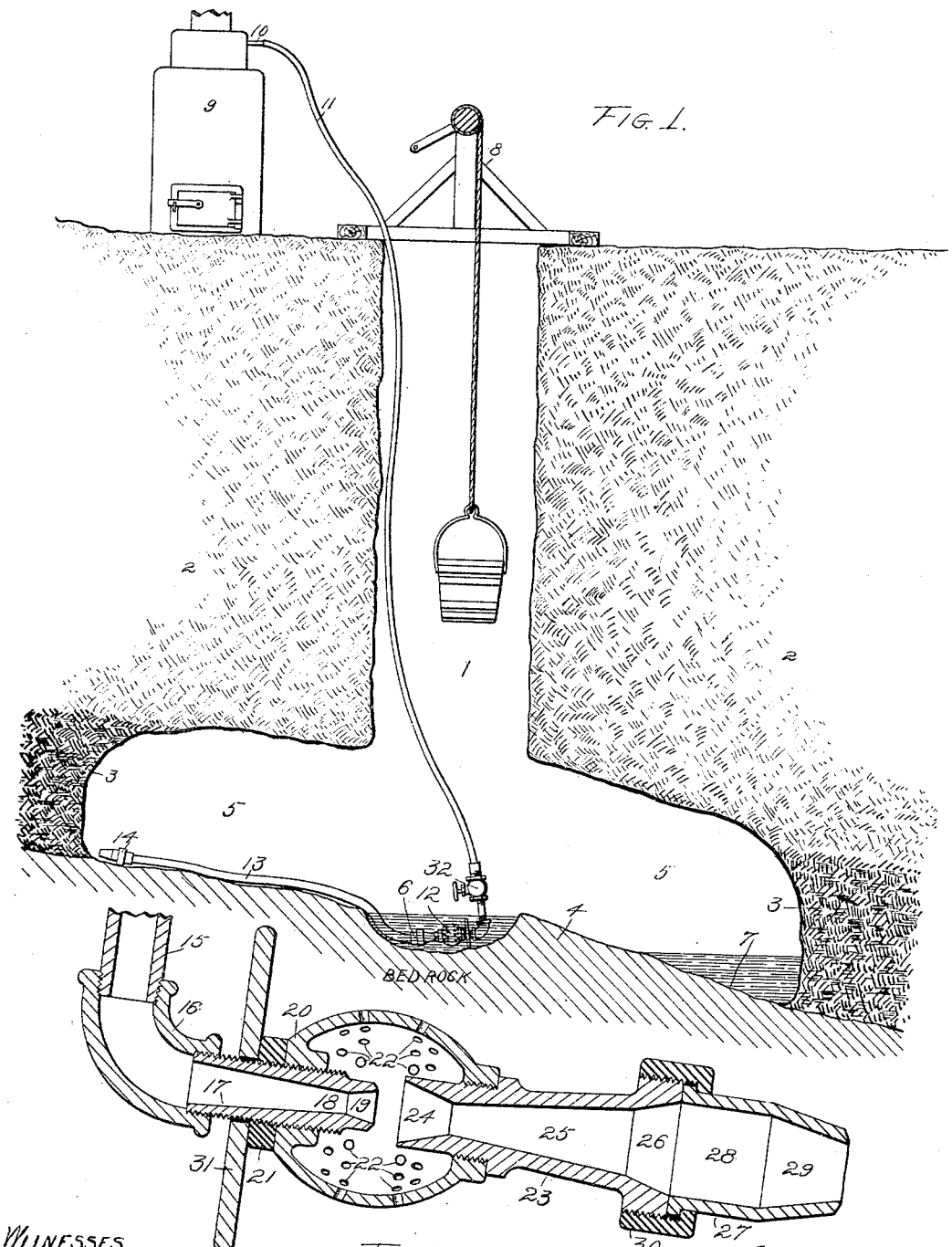

LOUIS ELDON MILLER, OF HELENA, MONTANA, ASSIGNOR, BY MESNE ASSIGNMENTS, TO THE ELLIOT MACHINE AND MINING COMPANY, OF NEW JERSEY.

EJECTOR.

SPECIFICATION forming part of Letters Patent No. 642,046, dated January 23, 1900.

Application filed April 5, 1898. Serial No. 676,547. (No model.)

*To all whom it may concern:*

Be it known that I, LOUIS ELDON MILLER, a citizen of the United States of America, and a resident of Helena, county of Lewis and Clarke, and State of Montana, have invented certain new and useful Improvements in Ejectors for Use in Thawing Frozen Ground, of which the following is a specification.

My invention is an improvement in steam-ejectors; and it consists in the novel features hereinafter described, reference being had to the accompanying drawings, which illustrate one form in which I have contemplated embodying my invention, and said invention is fully disclosed in the following description and claims.

Referring to the said drawings, Figure 1 represents a sectional view of a mine and apparatus for operating in frozen ground, showing the manner in which I use my improved ejector. Fig. 2 is a sectional view of the ejector detached.

In the drawings, 1 represents the vertical shaft of a mine sunk into frozen ground and in which I propose to use my improved ejector.

2 represents the ground surrounding the shaft, and 3 3 represent the lateral drifts, extending from the shaft into the ore-bearing strata above the bed-rock 4. A cavity is formed at the bottom of the mine for the reception of water, either by making a sump, as indicated at 6, or where the bed-rock is inclined by allowing the water to collect at the lowest part of the drift, as indicated at 7. The water will be supplied by the melting of the frozen earth and by the condensation of steam, as hereinafter set forth.

8 represents a windlass provided with a hoisting-rope and bucket for elevating the soil containing the ore out of the mine.

9 represents a steam-boiler having a steam-outlet 10 connected to a pipe 11, extending to the bottom of the shaft 1.

12 represents the main body of my improved ejector, which is preferably substantially spherical and is provided with means for admitting water to its interior, in this instance a series of apertures 22. At one end 20 of the main body of the ejector it is provided with an interiorly-threaded aperture, into which is screwed the adjustable steam or jet tube 17, threaded on its exterior and extending into the interior of the body 12. This steam-tube has a passage extending through it which is gradually decreased in diameter from the outer end to a point 18, adjacent to the inner end, and is then flared outwardly to form the steam-discharge aperture 19.

21 is a jam-nut on the outside of steam-tube 17, which is to be screwed up against the end 20 of the main body 12 to secure the steam-tube 17 rigidly in position.

The main body of the ejector is provided with a threaded aperture exactly opposite to that which receives the steam-tube 17, and in this latter aperture is screwed the discharge-tube 23 of the ejector, as shown in Fig. 2. The inner end of the discharge-tube is provided with an inwardly-tapering recess 24, the mouth of which is opposite and considerably larger than the delivery-aperture 19 of the steam-tube 17. This recess 24 communicates with an interior passage 25 in the discharge-tube 23, which increases in size gradually to the outer end of the tube. There it flares outwardly, as shown at 26. The outer end of the tube 23 is externally screw-threaded to fit ordinary hose-couplings of the required standard size. When the ejector is to be used to discharge water close to the ejector, the discharge-tube 23 is provided with a nozzle 27, having an internal passage 28 of the same size as the passage in the tube 23 at its outer end, which passage 28 is gradually reduced at the discharge end of the nozzle, as shown at 29. The nozzle 27 is secured to the tube 23 by a threaded coupling-ring 30. When it is desired to deliver the water at a distance from the ejector, the nozzle 27 is removed and a piece of hose 13 is connected thereto by a standard coupling, (see Fig. 1,) the said hose being provided with a nozzle 14 for directing the stream.

In operation the ejector is laid in a pool of water at the bottom of the mine, which may be in the sump 6 or a pool collected at the lowest portion of the drift, as at 7, and the steam-pipe 11 is connected to the steam-tube 17, preferably through the casing of a cut-off valve 32, a pipe 15, and elbow 16, as shown, so that the flow of steam can be controlled close to the ejector. The steam passing from the steam-tube to the discharge-tube 23 is condensed, water is drawn into the casing or main body 12 and heated by contact with the steam, and the hot water is forced out through the discharge-tube 23 and through the nozzle 27 (or hose 13 and nozzle 14) against the frozen ground with great force, thereby thawing out and disintegrating the soil, which is hoisted to the surface, while the water returns to the pool and is used over and over.

If the water is used too hot, it produces a mist or fog in the mine, and to avoid this the jam-nut 20 can be loosened and the steam-tube 17 unscrewed to withdraw it farther from the end 24 of the delivery-nozzle, and thereby allow more water to be drawn in in proportion to the amount of steam used. By this construction the steam-tube 17 can be adjusted to produce the desired temperature of the water discharged against the soil. In order to keep the ejector off of the bottom of the pool, I provide it with a large disk 31, which is preferably provided with a central aperture and is placed loosely over the steam-tube 17, so that the said disk can revolve as the ejector is moved, but will keep the ejector above the bottom of the pool and prevent dirt and gravel from entering the ejector. This disk or wheel also gives a downward inclination to the nozzle 27 when said nozzle is used for digging a shaft, causing the stream of hot water to impinge on the soil in the sump in which the injector is used.

It will be noted that by adjusting the steam or jet tube 17 in respect to the discharge-tube 23 the temperature of the water can be regulated, as before described, and the force with which the hot water is discharged can also be regulated and controlled. The farther the jet or steam-tube 17 is adjusted toward the discharge-tube the less water will be admitted into the ejector, and the water will be discharged at higher temperature and with greater force than when the tube 17 is moved farther away from the discharge-tube.

The process of and apparatus for thawing frozen ground herein shown and described in connection with the disclosure of the specific construction of my improved ejector is not herein claimed, as it forms the subject-matter of another application, filed by me on the 27th day of May, 1899, and given serial number 718,549.

What I claim, and desire to secure by Letters Patent, is—

1. An ejector for thawing frozen ground comprising among its members, a hollow main body provided with apertures for the admission of water, a discharge-nozzle rigidly secured to said main body, a steam-inlet pipe secured to said main body in line with the discharge-nozzle, and a supporting device connected with said main body for holding the main body above the bottom of the pool in which the ejector operates, and giving the nozzle a downward inclination, substantially as described.

2. An ejector for thawing frozen ground comprising among its members, a hollow main body provided with apertures for the admission of water, a discharge-nozzle rigidly connected to said main body, a longitudinally-adjustable steam-inlet tube secured to said main body in line with the discharge-nozzle and a supporting device secured to said main body for holding it above the bottom of the pool in which the ejector operates, and giving a downward inclination to said nozzle, substantially as described.

3. An ejector for thawing frozen ground, comprising among its members, a hollow main body provided with apertures for the admission of water, a discharge-tube provided with a detachable nozzle, a longitudinally-adjustable steam-inlet pipe in line with said discharge-tube and a rotary supporting-disk secured to said main body on the side opposite said nozzle, substantially as described.

4. An ejector for thawing frozen ground, comprising among its members, a hollow main body having its walls provided with water-inlet apertures, a discharge-tube secured to said main body and extending into the same, said tube having its longitudinal passage contracted at a point near its inner end and flaring in both directions from said contracted portion, and a longitudinally-adjustable steam-tube extending into said hollow body in line with the discharge-tube having its longitudinal passage contracted at a point near the inner end of the tube and flaring outwardly toward the ends of the tube from such contracted portion, a nozzle detachably secured to said discharge-tube and a supporting device for said main body, substantially as described.

5. An ejector for thawing frozen ground, comprising among its members, a hollow, substantially spherical body having its walls provided with water-inlet apertures, a discharge-tube rigidly secured to said main body, a nozzle detachably but rigidly secured to said discharge-tube, a longitudinally-adjustable steam-inlet tube having a threaded portion extending into said main body, and a revoluble supporting disk or wheel mounted on said steam-inlet tube and adapted to hold the main body above the bottom of the pool in which the ejector operates and to give said nozzle a downward inclination, substantially as described.

Signed by me at Seattle, King county, Washington, this 28th day of March, 1898.

LOUIS ELDON MILLER.

Witnesses:
JAMES H. MCLAUGHLIN,
NICHOLAUS JETTE.